(12) United States Patent
Katayama et al.

(10) Patent No.: US 6,782,155 B2
(45) Date of Patent: Aug. 24, 2004

(54) OPTICAL SWITCH

(75) Inventors: Makoto Katayama, Yokohama (JP); Manabu Shiozaki, Yokohama (JP); Masayuki Nishimura, Yokohama (JP); Tomohiko Kanie, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 87 days.

(21) Appl. No.: 10/150,992

(22) Filed: May 21, 2002

(65) Prior Publication Data

US 2002/0176653 A1 Nov. 28, 2002

(30) Foreign Application Priority Data

May 22, 2001 (JP) ...................................... 2001-152763

(51) Int. Cl.[7] .............................................. G02B 6/35
(52) U.S. Cl. ........................................ 385/19; 385/18
(58) Field of Search ............................. 385/18–19, 45, 385/129–132

(56) References Cited

U.S. PATENT DOCUMENTS

| | | | | |
|---|---|---|---|---|
| 5,960,131 A | * | 9/1999 | Fouquet et al. ............... | 385/17 |
| 6,363,183 B1 | * | 3/2002 | Koh ............................ | 385/19 |
| 6,408,112 B1 | * | 6/2002 | Bartels ....................... | 385/16 |
| 6,493,482 B1 | * | 12/2002 | Al-hemyari et al. .......... | 385/19 |

FOREIGN PATENT DOCUMENTS

| | | |
|---|---|---|
| EP | 0936483 A2 | 8/1999 |
| JP | 11-271559 | 10/1999 |

OTHER PUBLICATIONS

M. Katayama, T. Kanie, H. Okuyama, T. Sano, K. Koyama, T. Sasaki, C. Hirose, T. Hattori, M. Nishimura, and S. Semura, "Micromachined Curling Optical Switch Array for PLC–Based, Integrated Programmable Add/Drop Multiplexer," *Optical Fiber Communication Conference and Exhibit*, Mar. 21, 2001, WX4–1—WX4–3.

* cited by examiner

*Primary Examiner*—Akm Enayet Ullah
*Assistant Examiner*—Jerry T Rahll
(74) *Attorney, Agent, or Firm*—McDermott Will & Emery LLP

(57) ABSTRACT

An optical switch that can restrain the occurrence of cross talk is provided. A first waveguide path 11 and a second waveguide path 12 are provided on a waveguide substrate PCL so as to intersect each other at a given angle. A trench T is formed in a straight line in the surface of the waveguide substrate PCL so as to cross the central axes of the first waveguide path and the second waveguide path. The trench T is as deep as to expose the whole end face of the first waveguide path and the second waveguide path. The first waveguide path 11 and the second waveguide path 12 are arranged such that their central axes are arranged asymmetrically with respect to the straight line.

6 Claims, 10 Drawing Sheets

OPTICAL SWITCH

BACKGROUND OF THE INVENTION

1. Field of the Invention

The present invention relates to an optical switch which is provided in an optical communication system.

2. Description of the Background Art

An add-drop multiplexer (ADM) disclosed in Japanese Patent Application Publication No. 11-271559 is known as an optical device using an optical switch. The ADM is equipped with an input port waveguide, an optical demultiplexer, an optical multiplexer, and an output port waveguide on the substrate. The output port of the optical demultiplexer and the input port of the optical multiplexer are connected with waveguide paths. The waveguide paths include an optical multi-port switch that adds or drops signal light, or performs both.

A thermo-optic switch consisting of a Mach-Zehnder (MZ) interferometer is used for the optical switch. The thermo-optic switch has a heating element, which controls the optical path length (phase shift) of an arm of the MZ interference meter. The thermo-optic switch drops signal light from the optical demultiplexer and adds different signal light to the optical multiplexer, by applying an electric current to the heating element. On the other hand, in the condition in which no electric current is applied to the heating element, the thermo-optic switch outputs signal light from the optical demultiplexer into the optical multiplexer.

In the case of using a thermo-optic switch consisting of the MZ interferometer for an optical switch as in the case of the ADM, it is necessary to provide an optical path of corresponding length to achieve the desired phase difference. Therefore, the optical switch becomes large, and the ADM is large-sized as a whole. The operating speed of the ADM as an optical switch is slow (10 ms or more) because it uses the modulation of the refractive index due to the temperature variation (heating by heating elements). Moreover, in the ADM, in order to achieve uniform switching characteristics for a plurality of optical switches, it is necessary to adjust the amount of voltage to be applied to the heating elements. Consequently, the productivity is inferior.

An ADM using another type of optical switch is disclosed by M. Katayama et al. Proc. Optical Fiber Conf. Anaheim, 2001 WX4-1. The optical switch is equipped with a substrate on which a first waveguide path and a second waveguide path are provided such that they intersect each other, a trench having a depth which is as deep as to expose the whole end face of the first waveguide path and the second waveguide path at the intersecting part thereof, and a driving means which retains an optical element and moves them to an advancing direction and a retreating direction relative to the optical paths of the first waveguide path and the second waveguide path.

SUMMARY OF THE INVENTION

It is an object of the present invention to provide an optical switch in which cross talk is improved.

In order to achieve this object, the optical switch according to the present invention is provided with a substrate, a first waveguide path provided on the substrate, a second waveguide path that is provided, intersecting the first waveguide path, on the substrate, a trench which is as deep as to expose the whole end face of the first waveguide path and the second waveguide path at the part where they intersect each other, an optical element, and a driving means which moves the optical element in an advancing direction and a retreating direction relative to the optical path of the first waveguide path and the second waveguide path, wherein the first waveguide path and the second waveguide path are arranged such that their central axes are positioned at different angles at the part adjacent to the trench, with respect to a straight line extending in an orthogonal direction relative to the side face of the trench.

In one embodiment, the optical switch may have a driving means that retains the optical element in a space defined by the trench and moves them to an advancing direction and a retreating direction relative to the optical paths of the first waveguide path and the second waveguide path. The first and second waveguide paths may be formed such that their width is larger at the portion that faces the trench than at other portions.

The present invention is further explained below by referring to the accompanying drawings. The drawings are provided solely for the purpose of illustration and are not intended to limit the scope of the invention.

DETAILED DESCRIPTION OF THE INVENTION

Figure 1:
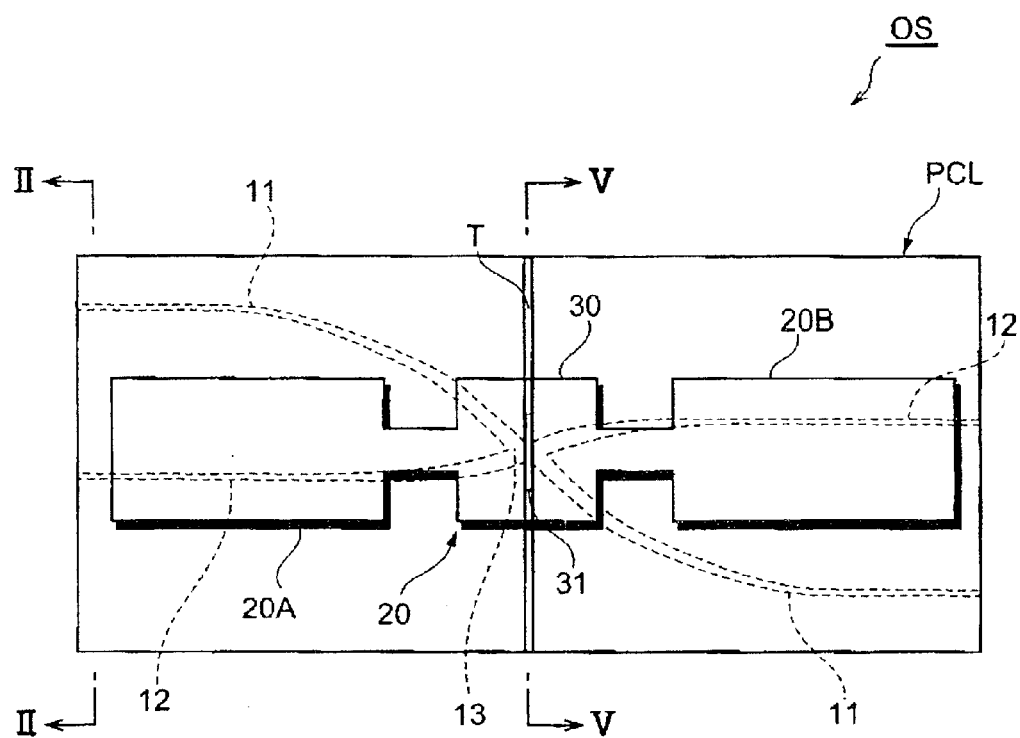
FIG. 1 is a plan view showing an embodiment of the optical switch according to the present invention.

Embodiments of the present invention are explained below by referring to the accompanying drawings. In the drawings, the same number bears the same sign to avoid duplicate explanation. The ratios of the dimensions in the drawings do not necessarily coincide with the explanation.

First, an explanation of the optical switch OS according to one embodiment of the present invention is given with reference to FIG. 1. FIG. 1 is a plan view of the optical switch OS. The optical switch OS has a waveguide substrate PCL on which a first waveguide path 11 and a second waveguide path 12 are provided, intersecting with each other at a given angle (10 degrees in the present embodiment). An electrostatic actuator 20 is provided as a driving means on the surface of the waveguide substrate PCL.

Figure 2:
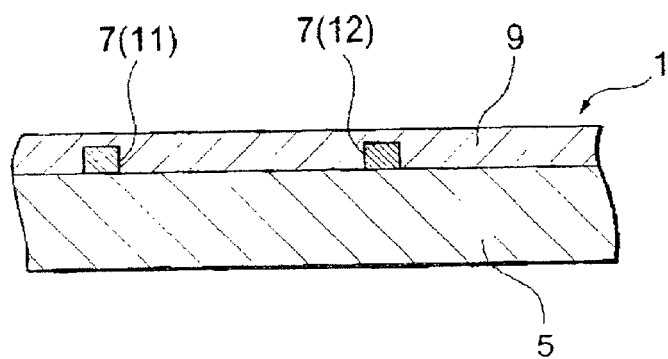
FIG. 2 is a cross-sectional view taken along the line II–II of the optical switch of FIG. 1.

FIG. 2 is a cross-sectional view taken along the line II—II of the optical switch of FIG. 1. The waveguide substrate PCL comprises an $SiO_2$ substrate 5 (a silicon substrate may be used), cores 7 (equivalent to the first waveguide path 11 and the second waveguide path 12), which are patterned on the substrate, and a cladding 9 which covers the cores 7. In the present embodiment, the cores 7 are designed to have relative refractive index difference $\Delta=0.4\%$, a thickness of 7 $\mu$m, and refractive index n=1.45. Also, the interval between the first waveguide path 11 and the second waveguide path 12 is set to 250 $\mu$m at the input/output ends (the end portions of the waveguide substrate PCL).

In the surface of the waveguide substrate PCL, a trench T is formed, extending in a straight line at the intersecting part 13 of the first waveguide path 11 and the second waveguide path 12. The trench T has a depth that is as deep as to expose the whole end face of the first waveguide path 11 and the second waveguide path 12. In the present embodiment, the trench T having a width of 55 $\mu$m and a depth of 50 $\mu$m is formed by dicing on the waveguide substrate PCL having a thickness of 850 $\mu$m.

An electrostatic actuator 20 is provided on the surface of the waveguide substrate PCL in a manner in which a part of the trench T is covered with the actuator. The electrostatic actuator 20 has one pair of actuating parts 20A and 20B, which are arranged in a manner such that the trench T is positioned between them, and a supporting part 30, which is provided between the actuating parts 20A and 20B in such a manner as to cover the trench T. The actuating parts 20A and 20B constitute the actuating system of the electrostatic actuator 20.

A mirror 31 is provided as an optical element in the supporting part 30, and the supporting part 30 moves along the trench T by means of the actuating system of the electrostatic actuator 20. The mirror 31 is movable along the trench T in the condition in which it is sustained in the trench T by the supporting part 30. In the present embodiment, the mirror 31 has a flat board shape of 30 $\mu$m in thickness×40 $\mu$m in height×30 $\mu$m in width. The electrostatic actuator 20 moves the mirror 31 to an advancing direction and a retreating direction relative to the optical paths of the first waveguide path 11 and the second waveguide path 12 in the space defined by the trench T. The above-mentioned waveguide substrate PCL in the optical switch OS according to the present embodiment may be a part of an optical device such as an AWG circuit having a waveguide array.

The cores 7 (the first waveguide path 11 and the second waveguide path 12) have a larger width in the waveguide path at the portion facing the trench T than at the other part of the waveguide path. In the present embodiment, the width is set to 7 $\mu$m, the mode field diameter (MFDx) in the width direction is set to 9.9 $\mu$m, and the mode field diameter (MFDy) in the thickness direction is set to 9.9 $\mu$m at the input/output end, respectively. In the intersecting part 13, the width is set to 23.5 $\mu$m, the mode field diameter (MFDx) in the width direction is set to 20.1 $\mu$m, and the mode field diameter (MFDy) in the thickness direction is set to 9.2 $\mu$m.

Figure 3:
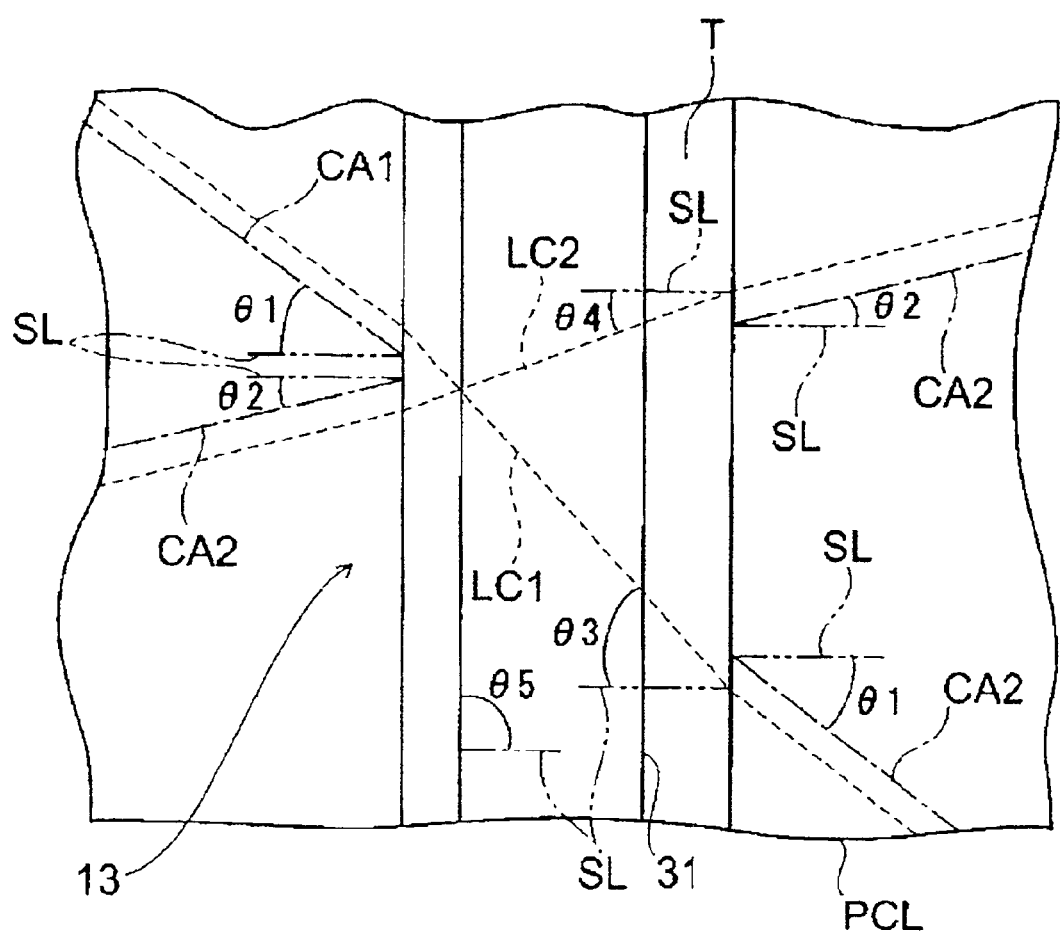
FIG. 3 is an enlarged plan view showing the intersecting part of the waveguide paths of the optical switch of FIG. 1.

FIG. 3 is an enlarged plan view showing the intersecting part of the waveguide paths of the optical switch of FIG. 1. The first waveguide path 11 and the second waveguide path 12 are arranged in the intersecting part 13 such that an angle $\theta 1$ between a straight line SL extending in an orthogonal direction relative to the side face of the trench T and the central axis CA1 of the first waveguide path 11 differs from an angle $\theta 2$ between a straight line SL and the central axis CA2 of the second waveguide path 12.

The trench T is formed so as to cross the central axes CA1 and CA2 of the first waveguide path 11 and the second waveguide path 12, respectively. The interval between the central axis CA1 and the central axis CA2 at one side of the trench T is set to 0.661 $\mu$m, and the interval between the central axis CA1 and the central axis CA2 at the other side of the trench T is set to 9.625 $\mu$m.

Since the first waveguide path 11 curves gradually, the center (optical axis) LC1 of the light which passes in the first waveguide path 11 is at a position which is shifted to the outside of the curve from the central axis CA1 of the first waveguide path 11, and the discrepancy between the central axis CA1 and the optical axis LC1 is 1.0 $\mu$m at the side face of the trench T. Similarly, the second waveguide path 12 also curves gradually, and the center (optical axis) LC2 of the light which passes in the second waveguide path 12 is at a position which is shifted to the outside of the curve from the central axis CA2 of the second waveguide path 12. The discrepancy between the central axis CA2 and the optical axis LC2 is 0.9 $\mu$m at the side face of the trench T. Since air (n=1.0) exists in the trench T, an angle $\theta 3$ between the optical axis LC1 and a straight line SL extending in an orthogonal direction relative to the side face of the trench T becomes 10.910 degrees, and an angle $\theta 4$ between a straight line SL and the optical axis LC2 becomes 3.626 degrees. The position of each core of the first waveguide path 11 and the second waveguide path 12 at one side of the trench T is not geometrically on the prolongation line of each corresponding core at the other side of the trench T. The angle formed by the first waveguide path 11 and the second waveguide path 12 means the angle formed by the optical axes LC1 and LC2.

Since the angle $\theta 1$ and angle $\theta 2$ are set to different values, the mirror 31 is arranged in a position tilting from a right angle relative to the straight line SL so that the light emitted from one waveguide path and reflected from the mirror 31 is incident appropriately onto the other waveguide path. In the present embodiment, the angle $\theta 5$ between the specular surface of the mirror 31 and the straight line SL is set to 86.358 degrees. The interval between the side face of the trench T and the position (the point of intersection between LC1 and LC2) where the light emitted from a waveguide path is reflected on the mirror 31 is set to 10 $\mu$m.

In the present embodiment, the width of the trench T is set to 55 $\mu$m, the mode field diameter (MFDx) in the width direction of the cores 7 (the first waveguide path 11 and second waveguide path 12) is set to 20.1 μm at the intersecting part 13, the angle θ1 is set to 7.5 degrees, and the angle θ2 is set to 2.5 degrees.

These are set based on the following calculation results.

Figure 9:
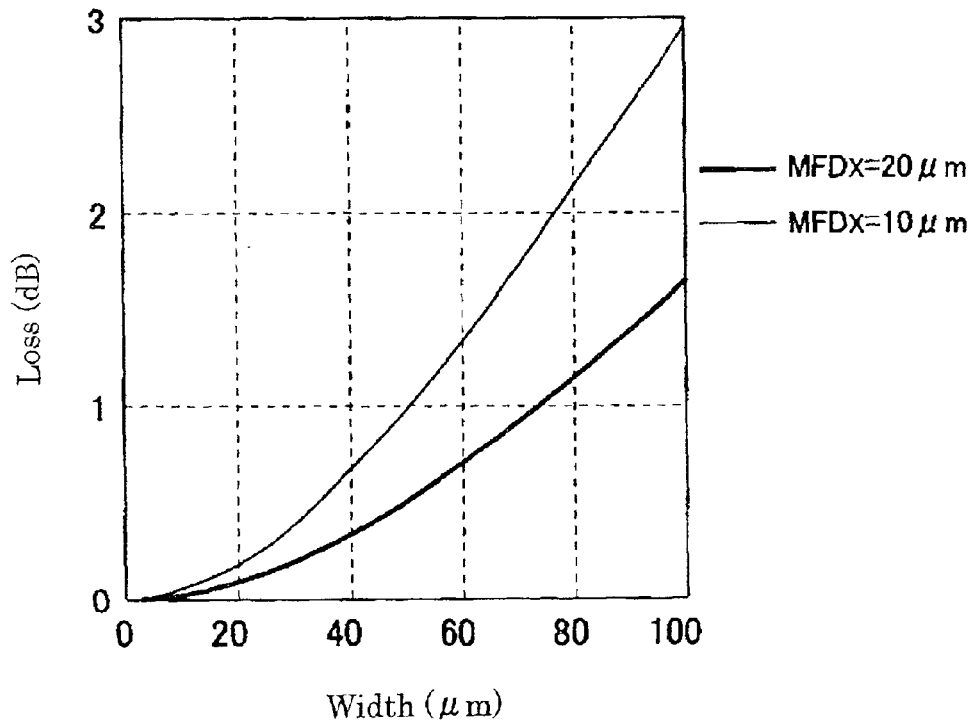
FIG. 9 is a graph showing the relationship between the trench width and the loss of the transmitted light.

First, for the purpose of evaluating the transmission loss in the trench T, the relationship between the trench width and the loss was calculated in the cases where the mode field diameter (MFDx) in the width direction of cores 7 (the first waveguide path 11 and second waveguide path 12) was 10 μm and 20 μm at the intersecting part 13, respectively, The results are shown in FIG. 9. Here, it was assumed that the mode field diameter (MFDy) in the thickness direction of the cores 7 at the intersecting part 13 was 10 μm, the mode field diameters of the waveguide path at both sides of the trench T were equal, and there were no axial or angular discrepancies.

As can be seen from FIG. 9, the loss of the transmitted light is less in the case where the mode field diameter (MFDx) is 20 μm. Preferably, the loss of the transmitted light is 1 dB, and in the case where the mode field diameter (MFDx) is 20 μm, the trench width needs to be set to equal to or less than 60 μm, since the loss occurs actually due to the reflection at the side face of the trench T.

Figure 10:
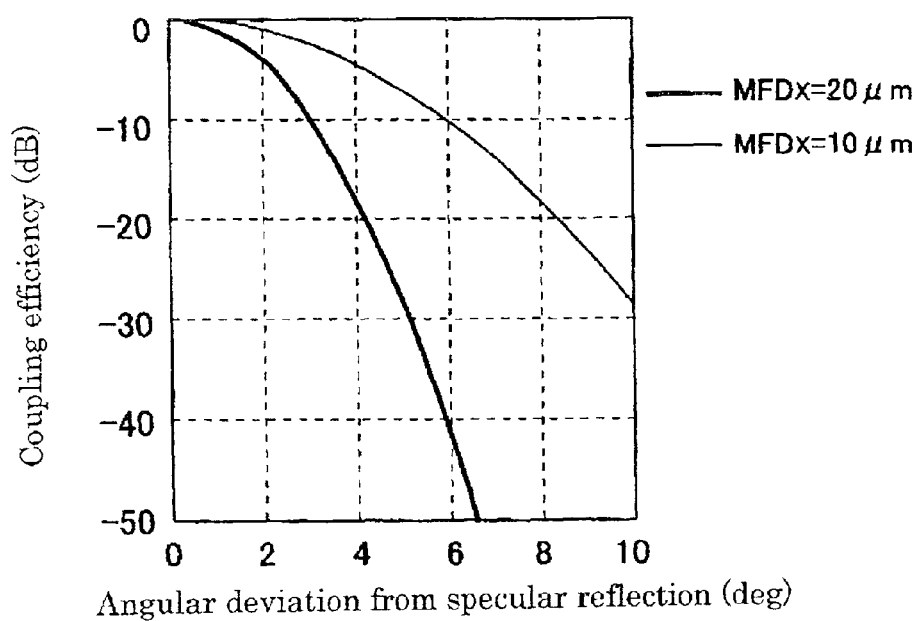
FIG. 10 is a graph showing the coupling efficiency when the direction of a waveguide path shifts at a given angle from the direction of the specular reflection.

Next, in order to evaluate cross talk (the coupling efficiency of light reflected from the side face of the trench T to a waveguide path), the coupling efficiency was computed for the cases where the direction of the waveguide path is shifted by a given angle from the direction of specular reflection, with respect to the cases in which the mode field diameter (MFDx) in the width direction of the cores 7 (the first waveguide path 11 and the second waveguide path 12) at the intersecting part 13 is 10 μm and 20 μm, respectively. The results are shown in FIG. 10. Here, the computation was made on the assumption that the mode field diameter (MFDy) in the thickness direction of the cores 7 at the intersecting part 13 was 10 μm and that there was no displacement in the waveguide path and the optical axis of the light reflected at the side face of the trench T, while the angular deviation existed.

As shown in FIG. 10, the coupling efficiency (cross talk) at the side face of the trench T is lower in the case where the mode field diameter (MFDx) is 20 μm. Since it is preferable that the cross talk be −30 dB or less, the displacement in the direction of the waveguide path from the direction of the specular reflection at the side face of the trench T, that is, the difference between the angles θ1 and θ2 (i.e., θ1−θ2) needs to be set to 5 degrees or more in the case where the mode field diameter (MFDx) is 20 μm.

Figure 4:
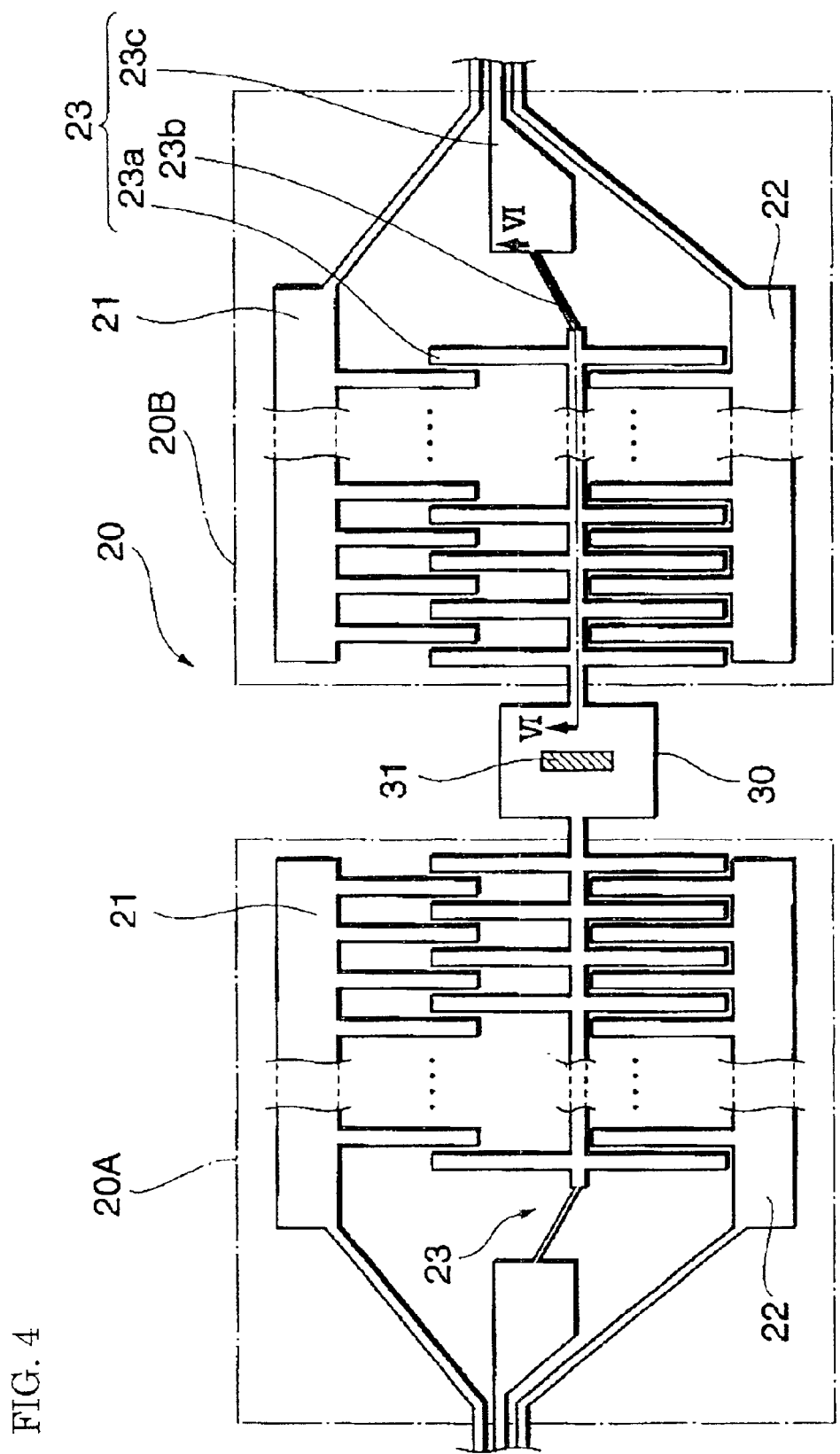
FIG. 4 is a plan view showing an electrostatic actuator of the optical switch of FIG. 1.

Next, the composition of the electrostatic actuator 20 is explained. FIG. 4 is a plan view showing an electrostatic actuator of the optical switch of FIG. 1. Since the electrostatic actuator 20 can be driven at low voltage, it is suitable for an actuating system of a micro device such as the optical switch.

In FIG. 4, the electrostatic actuator 20 is provided with an actuating system consisting of one pair of actuating parts 20A and 20B formed in the surface of the waveguide substrate PCL with the trench T positioned therebetween. Since the structure of the actuating parts 20A and 20B is symmetrical relative to the trench T, an explanation is given only with respect to the structure of the actuating part 20B in the following.

The actuating part 20B comprises a first comb-shaped electrode 21 and a second comb-shaped electrode 22, which are provided opposite to each other in the surface of the waveguide substrate PCL. It also comprises a comb-shaped floating electrode 23, which is situated between the first and second comb-shaped electrodes 21 and 22 and is partially distanced from the surface of the waveguide substrate PCL. The comb-shaped floating electrode 23 is composed of a comb-shaped electrode part 23a, a base part 23c formed directly on the surface of waveguide substrate PCL, and a flat spring 23b which connects the comb-shaped electrode part 23a with the base part 23c and which supports the comb-shaped electrode part 23a, placing it at a given distance from the surface of the waveguide substrate PCL. A supporting part 30 to which the mirror 31 is attached is supported by each comb-shaped floating electrode 23 of the actuating parts 20A and 20B such that it covers a part of the trench T.

Figure 5:
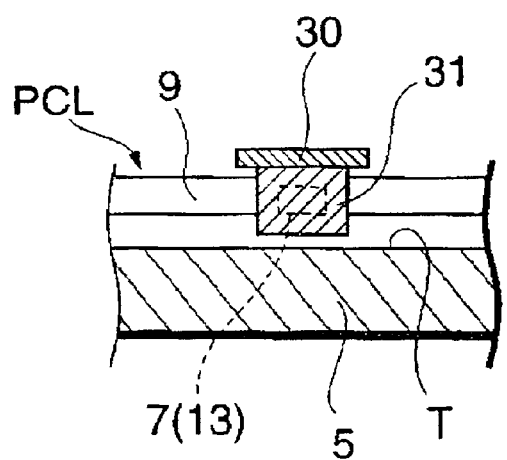
FIG. 5 shows a partial cross-sectional structure of a waveguide substrate and the cross-sectional structure of an electrostatic actuator taken along the line V—V of the optical switch of FIG. 1.

FIG. 5 shows the state in which the mirror 31 is sustained in the space defined by the trench T as described above. FIG. 5 also depicts a partial cross-sectional structure of the waveguide substrate PCL and the cross-sectional structure of the electrostatic actuator 20 along the line V—V of the optical switch of FIG. 1.

Figure 6:
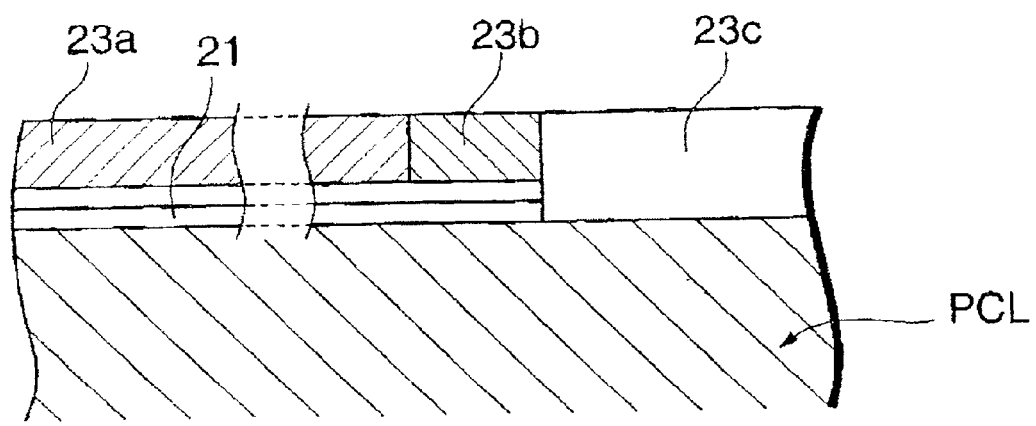
FIG. 6 shows a partial cross-sectional structure of the waveguide substrate and the electrostatic actuator taken along the line VI—VI of the electrostatic actuator of FIG. 4.

FIG. 6 illustrates a partial cross-sectional structure (the vicinity of the flat spring 23b, in particular) of the waveguide substrate PCL and the electrostatic actuator 20 taken along the line VI—VI of the electrostatic actuator of FIG. 4. As for the method for forming a comb-shaped floating electrode, such as the comb-shaped floating electrode 23, so as to be distanced from the surface of a waveguide substrate PCL, there are detailed descriptions in "Micro-machining and micro-mechatronics" (Baifukan, June, 1992), for example.

Figure 7:
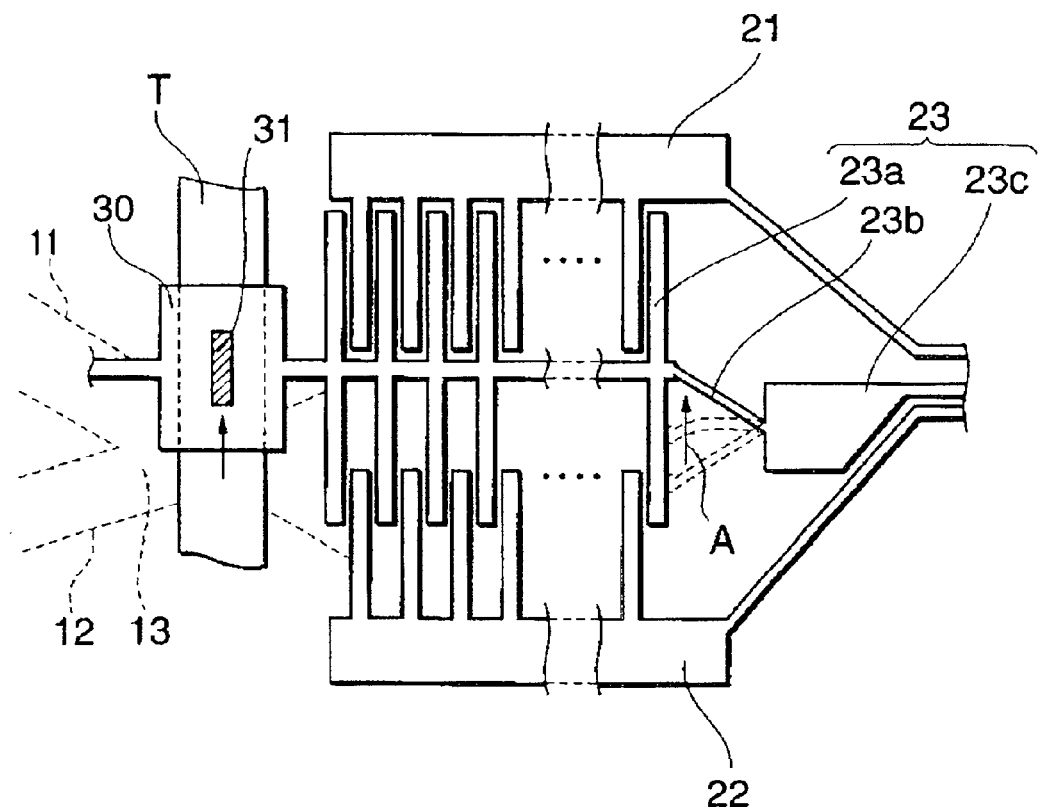
FIG. 7 illustrates the operation of the electrostatic actuator.
Figure 8:
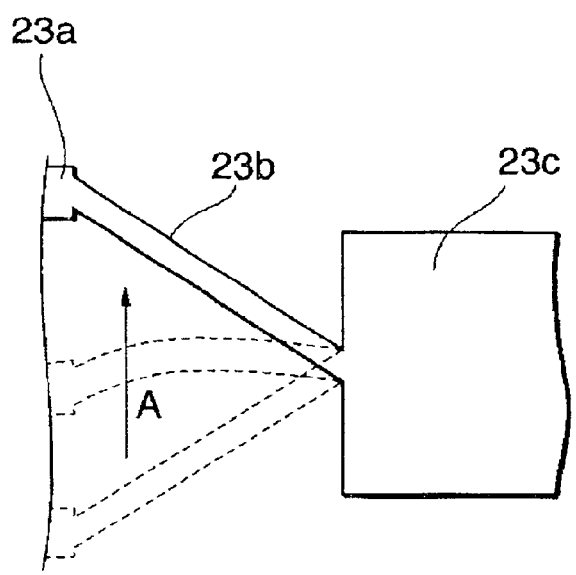
FIG. 8 illustrates the shape variation of the flat spring in the electrostatic actuator.

Next, the driving operation for moving the mirror 31 of the electrostatic actuator 20 according to one embodiment of the optical switch of the present invention is explained with reference to FIGS. 7 and 8. FIG. 7 illustrates the electrodes 21 through 23 in the state where a given voltage is applied between the first comb-shaped electrode 21 and the comb-shaped floating electrode 23. FIG. 8 depicts the shape variation of the flat spring 23b in the electrostatic actuator 20.

First, when a predetermined voltage is applied between the first comb-shaped electrode 21 and the comb-shaped floating electrode 23, the comb-shaped floating electrode 23, which is distanced from the surface of the waveguide substrate PCL through a space, is pulled by the first comb-shaped electrode 21 as a whole as shown in FIG. 7. As the position of the comb-shaped floating electrode 23 is shifted in the direction shown by arrow A in FIG. 7, the supporting part 30 which is sustained by the comb-shaped floating electrode 23 of each of the actuating parts 20A and 20B moves (about 50 μm) also in the direction shown by arrow A. That is, the position in the trench T of the mirror 31 attached to the supporting part 30 is shifted according to the movement of the supporting part 30. In such case, as the whole comb-shaped floating electrode 23 moves, the flat spring 23b is curved once and then stops (self-sustaining) in the state of a straight line as shown in FIG. 8, and the position of the comb-shaped electrode part 23a of the comb-shaped floating electrode 23 is fixed under the condition in which no voltage is applied.

On the other hand, when a predetermined voltage is applied between the second comb-shaped electrode 22 and the comb-shaped floating electrode 23, the position of the mirror 31 in the trench T moves in the direction opposite to the direction shown by arrow A and is fixed by the self-sustaining function.

The self-sustaining function of the comb-shaped floating electrode 23 as described above can be changed to other transition schemes by altering the shape of the structure including the flat spring 23b. In FIG. 8, the thickness (perpendicular direction relative to the surface of the waveguide substrate PCL) of the flat spring 23b is larger than the width of the flat spring 23b such that switching operation is performed by the structure in which it easily bends in the surface in the plan view of the waveguide substrate PCL.

As described above, in the optical switch OS of the present embodiment, the first waveguide path 11 and the second waveguide path 12 are arranged such that the angle formed at the intersecting part 13 by each of the central axes CA1 and CA2 and the straight line SL which extends in the direction orthogonal to the side face of the trench T differs. Therefore, in the case where light that has passed through one side of the waveguide path 11 or 12 is reflected at the end face that faces the trench T, the light is restrained from entering the other side of the waveguide paths 12 or 11. As a result, the cross talk can be reduced. Such structure of asymmetry can be achieved easily and at low cost.

The optical switch OS of the present embodiment is further provided with the electrostatic actuator 20 which is provided on the surface of waveguide substrate PCL and which moves the mirror 31 in the advancing direction and the retreating direction relative to the optical path of the first waveguide path 11 and the second waveguide path 12 while sustaining the mirror 31 in the space defined by the trench T. Since the electrostatic actuator 20 is provided on the surface of the waveguide substrate PCL, there is a high degree of freedom in the laying-out of the electrostatic actuator 20. This allows an easy mounting of the electrostatic actuator 20 to the waveguide substrate PCL.

Also, in the optical switch OS of the present embodiment, the waveguide path width of the first waveguide path 11 and the second waveguide path 12 is larger at the part facing the trench T than at the other part. Accordingly, the mode field diameter of the first waveguide path 11 and the second waveguide path 12 is expanded at the end face which is exposed to the trench T, and the loss of light at the time when the light passes through the space defined by the trench T can be reduced. Such reduction in the loss has an effect of expanding the latitude of the displacement (the deviation to an orthogonal direction relative to the direction in which the trench T extends) of the mirror 31. This allows the tolerance of arranging the mirror 31 to be large. As a result, the optical switch OS can be manufactured easily.

An experiment was performed for evaluating the cross talk reduction that can be achieved in an optical switch of the present invention by arranging the first waveguide path 11 and the second waveguide path 12 in a manner in which the angles formed at the intersecting part 13 by their respective central axes CA1 and CA2 and a straight line SL extending in an orthogonal direction relative to the side face of the trench T differ from each other.

Figure 11:
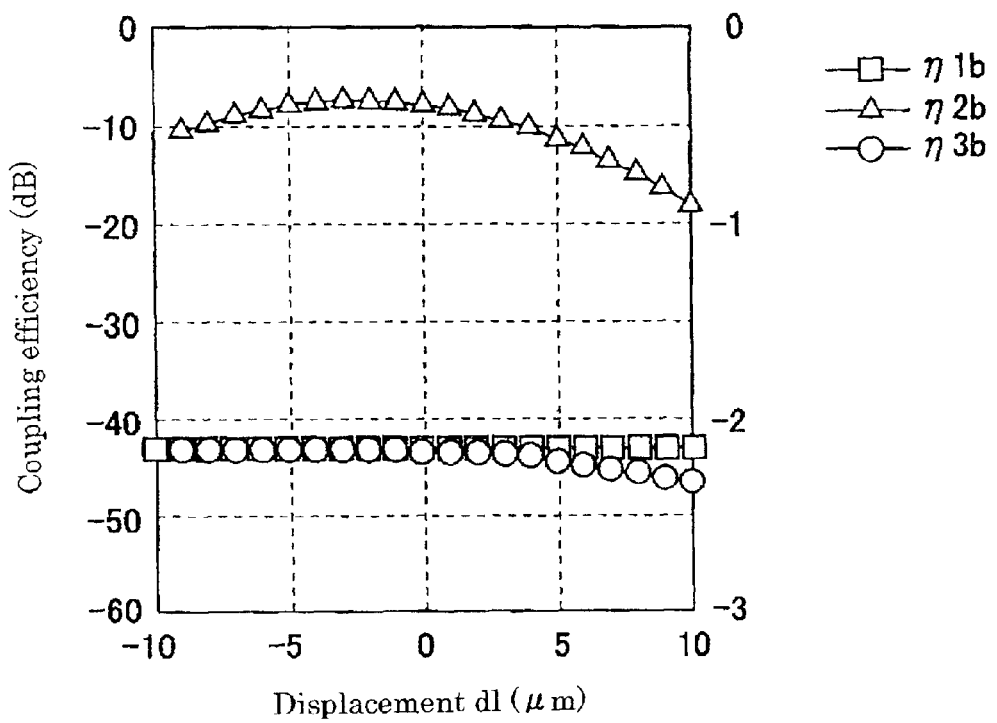
FIG. 11 is a graph showing the relationship between the mirror displacement and the coupling efficiency of the reflected light to the waveguide path in Example 1.
Figure 12:
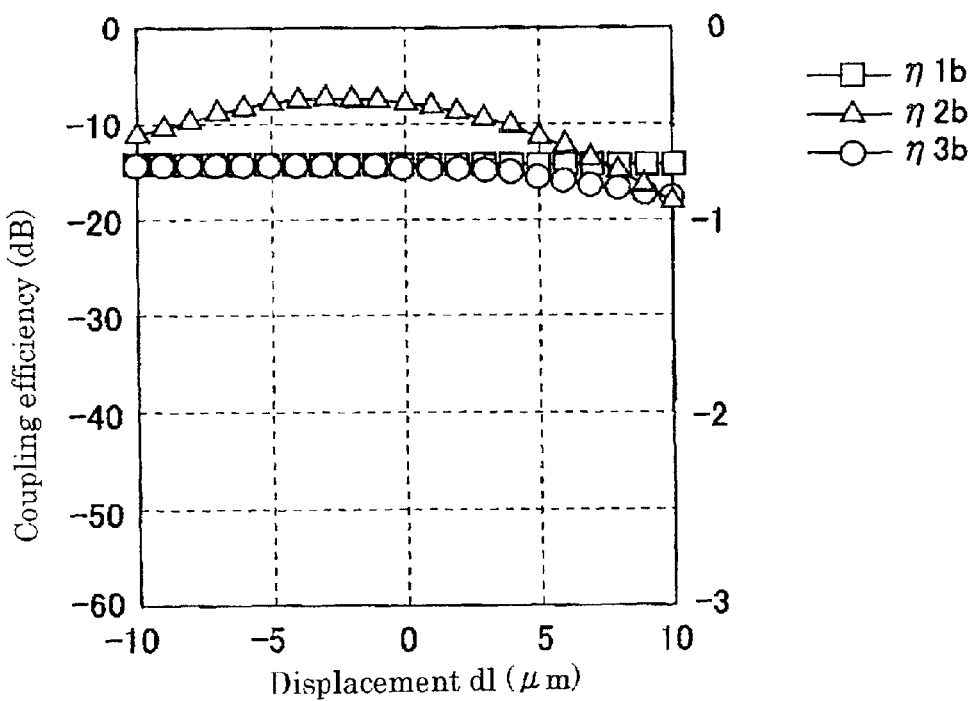
FIG. 12 is a graph showing the relationship between the mirror displacement and the coupling efficiency of the reflected light to the waveguide path in Comparative Example 1.

The results are shown in FIGS. 11 and 12. FIGS. 11 and 12 show the variation of the coupling efficiency to the displacement dl of the mirror 31 (deviation to an orthogonal direction relative to the direction in which the trench T extends). FIG. 11 shows the results of Example 1 of the present invention, and FIG. 12 shows the results of Comparative Example 1.

Figure 13:
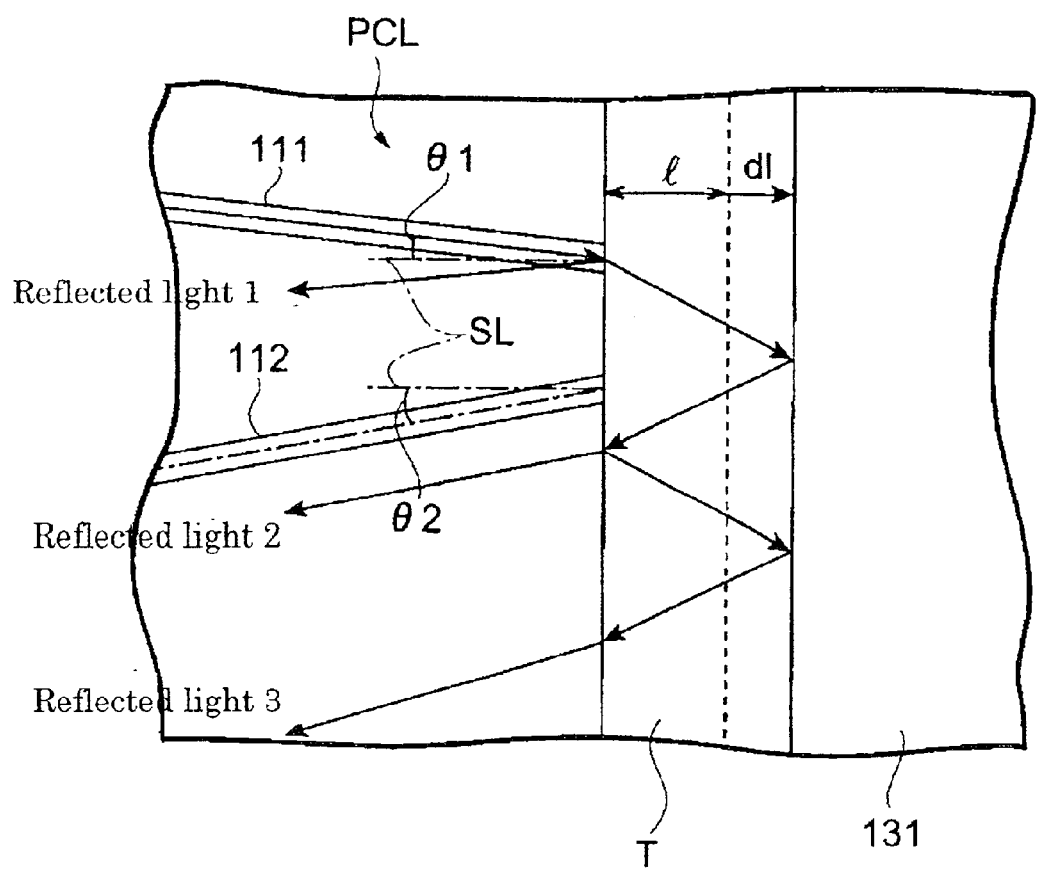
FIG. 13 is an enlarged view for explaining the optical switch used in Example 1 and Comparative Example 1.

First, an explanation about the composition of the optical switch used in Example 1 and Comparative Example 1 is given. This optical switch is provided with a first waveguide path 111 and a second waveguide path 112 which intersect each other at a given angle on a waveguide substrate PCL as shown in FIG. 13. In the surface of the waveguide substrate PCL, a trench T is formed extending in a straight line crossing the respective central axes of the first waveguide path 111 and the second waveguide path 112 at the intersecting part of the first waveguide path 111 and the second waveguide path 112. A mirror 131 is disposed in the space defined by the trench T (in the air). The distance l from one side face of the trench T to the specular surface of the mirror 131 which is located in the standard position (the position indicated by a broken line in the figure) is set to 20 μm.

In FIG. 13, reflected light 1 is the light which has passed through the first waveguide path 111 and is reflected at the end face (the side face of the trench T) of the first waveguide path 111. Reflected light 2 is the light that has been emitted from the first waveguide path 111 and is incident on the waveguide substrate PCL by reflection at the mirror 131. Reflected light 3 is the light that has been emitted from the first waveguide path 111 and is incident on the waveguide substrate PCL by reflection at the mirror 131 and the side face of the trench T.

In Example 1, the angle θ1 formed by the first waveguide path 111 (central axis) and the straight line SL extending in an orthogonal direction relative to the side face of the trench T is set to 2.5 degrees, and the angle θ2 formed by the straight line SL and the second waveguide path 112 (central axis) is set to 7.5 degrees. On the other hand, in Comparative Example 1, the angles θ1 and θ2 are both set to 5 degrees.

The experiments in both Example 1 and Comparative Example were performed by measuring variations in the coupling efficiency η1b of reflected light 1 to the second waveguide path 112, the coupling efficiency η2b of reflected light 2 to the second waveguide path 112, and the coupling efficiency η3b of reflected light 3 to the second waveguide path 112 according to the displacement dl of the mirror 31. As can be seen from FIGS. 11 and 12, the coupling efficiency η1b and the coupling efficiency η3b in Comparative Example 1 are about −15 dB, whereas in Example 1 they are about −45 dB. Thus, the improvement is about 30 dB. It can be understood from the above that in Example 1 according to the present invention the effect of cross talk reduction is excellent, while in Comparative Example 1 in which the first waveguide path and the second waveguide path are arranged such that the angles formed at the intersecting part by their respective central axis and a straight line extending in an orthogonal direction relative to the side face of the trench are equal to each other, light that has passed through one of the waveguide paths is reflected at the emitting end face in the above-described space and is introduced into the other of the waveguide paths, thereby causing cross talk.

Figure 14:
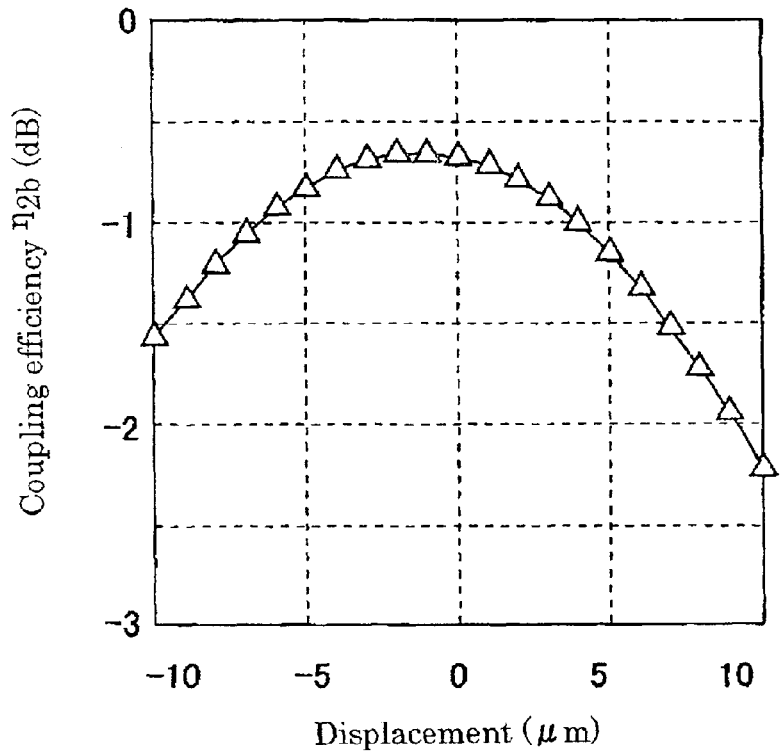
FIG. 14 is a graph showing the relationship between the mirror displacement and the coupling efficiency of the reflected light to the waveguide path in Experimental example 1.
Figure 15:
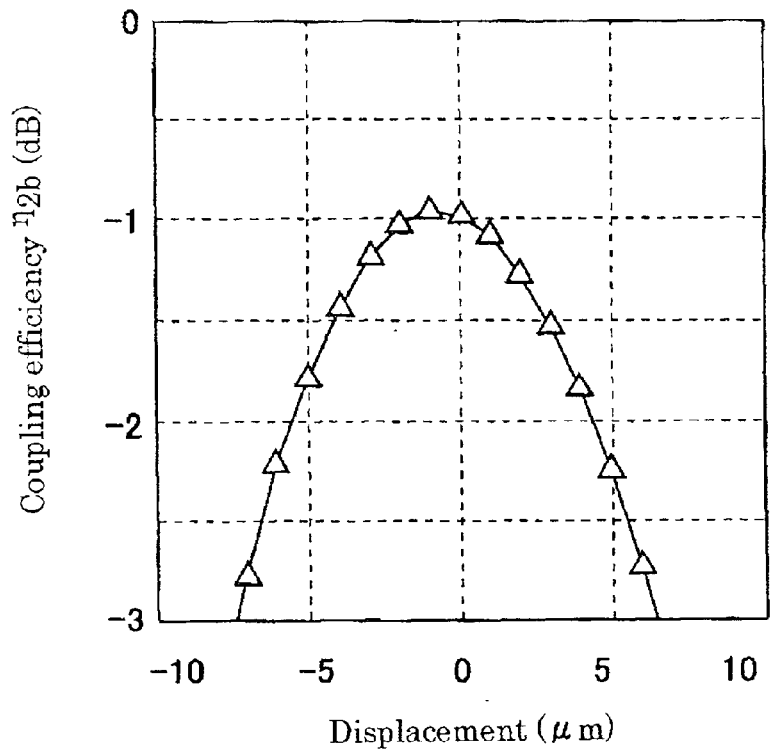
FIG. 15 is a graph showing the relationship between the mirror displacement and the coupling efficiency of the reflected light to the waveguide path in Experimental example 2.

Another experiment was performed to evaluate the loss reduction effected by making the waveguide path width of the first waveguide path 11 and the second waveguide path 12 larger at a part facing the trench T than the waveguide path width of the other part, respectively. The results are shown in FIGS. 14 and 15. FIGS. 14 and 15 show the variation of the coupling efficiency to the displacement dl of the mirror 31. FIG. 14 shows the results of the Experimental example 1, and FIG. 15 shows the results of the Experimental example 2.

In the experiments an optical switch having the structure shown in FIG. 13 was used, and in Experimental example 1, the mode field diameter (MFDx) in the width direction was set to 20 μm at the end portion of the first waveguide path 111 and the second waveguide path 112, respectively. In Experimental example 2, the mode field diameter (MFDx) in the width direction was set to 10 μm at the end portion of the first waveguide path 111 and the second waveguide path 112. The mode field diameter (MFDy) in the thickness direction at the end portion of the first waveguide path 111 and the second waveguide path 112 was set to 10 μm, respectively. In both examples, the angle θ1 formed by the first waveguide path 111 (the central axis) and the straight line SL extending in an orthogonal direction relative to the side face of the trench T, and the angle θ2 formed by the straight line SL and the second waveguide path 112 (the central axis) were both set to 10 degrees.

In both experimental examples, the experiments were conducted by measuring the variations in the coupling efficiency η2b of reflected light 2 to the second waveguide path 112 according to the displacement dl of the mirror 31. As can be seen from FIGS. 14 and 15, in the displacement dl of the mirror 31 in the range of −5−+5μm, Experimental example 1 is larger than about −1 dB, while Experimental example 2 is −1 dB or less. Thus, Experimental example 1 exhibited superior excellent loss reduction effect.

Figure 16:
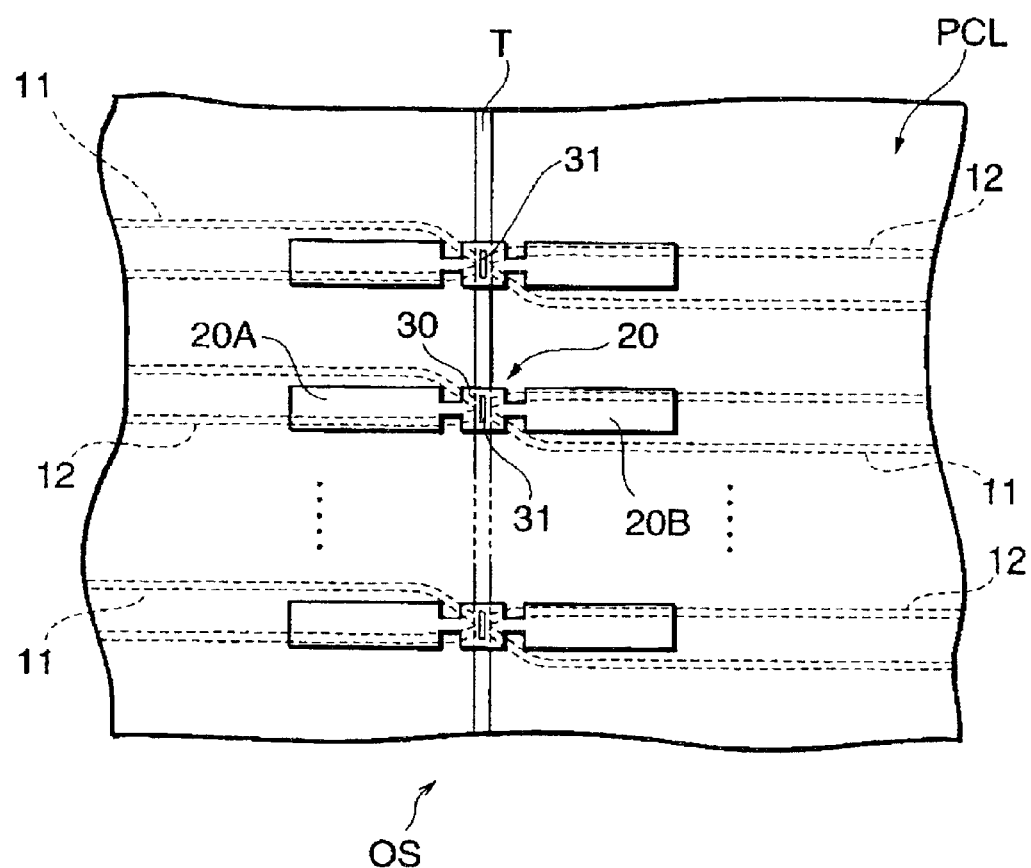
FIG. 16 is a plan view showing a modified example of the embodiment of the optical switch according to the present invention.

The present invention is not limited to the above-mentioned embodiments. As shown in FIG. 16, the present invention can also be applied to the case in which a plurality of sets of the first waveguide path 11 and the second waveguide paths 12 which are arranged so as to intersect each other at a given angle are provided in arrays. Also, an optical element such as an optical filter that selectively allows light having a given wavelength to penetrate may be used.

What is claimed is:

1. An optical switch comprising a substrate, a first waveguide path provided on the substrate, and a second waveguide path provided on the substrate so as to intersect the first waveguide path, wherein a trench is provided at the part where the first waveguide path and the second waveguide path intersect each other, the trench extending in a straight line and being as deep as to expose the whole end face of the first waveguide path and the second waveguide path, the first waveguide path and the second waveguide path being arranged such that the central axes thereof are positioned at different angles at the part adjacent to the trench with respect to a straight line extending in an orthogonal direction relative to the side face of the trench.

2. An optical switch as set forth in claim 1, wherein an optical element and a driving means are provided, the optical element being moved by the driving means in an advancing direction and a retreating direction relative to the optical path of the first waveguide path and the second waveguide path.

3. An optical switch as set forth in claim 2, wherein the driving means sustains the optical element in the space defined by the trench and moves the optical element in an advancing direction and a retreating direction relative to the optical path of the first waveguide path and the second waveguide path.

4. An optical switch as set forth in any of claims 1 through 3, wherein the waveguide width of the first waveguide path and the second waveguide path is made larger at the portion that faces the trench than at other portions.

5. An optical switch as set forth in claim 3, wherein the optical element is arranged in a position not parallel to the trench.

6. An optical switch as set forth in claim 5, wherein the optical element is a mirror.

* * * * *